United States Patent [19]

Takaki et al.

[11] Patent Number: 5,541,256
[45] Date of Patent: Jul. 30, 1996

[54] PROCESS FOR PREPARING SYNTHETIC RESIN POWDER HAVING IMPROVED BLOCKING RESISTANCE

[75] Inventors: Akira Takaki; Toshiyuki Mori, both of Kobe; Toshiro Shimatani, Takasago; Toshihiko Hasegawa, Hyogo-ken, all of Japan

[73] Assignee: Kanegafuchi Kagaku Kogyo Kabushiki Kaisha, Osaka, Japan

[21] Appl. No.: 262,027

[22] Filed: Jun. 17, 1994

[30] Foreign Application Priority Data

Jun. 18, 1993 [JP] Japan ................... 5-147882

[51] Int. Cl.$^6$ ................................. C08L 51/04
[52] U.S. Cl. ................... 525/82; 525/83; 525/87
[58] Field of Search ................... 525/82, 83, 87

[56] References Cited

U.S. PATENT DOCUMENTS

| | | | |
|---|---|---|---|
| 4,275,178 | 6/1981 | Yusa | 525/71 |
| 4,463,131 | 7/1984 | Grandzol | 525/76 |
| 4,897,462 | 1/1990 | Yusa | 528/486 |
| 5,306,763 | 4/1994 | Matsumoto | 524/501 |
| 5,362,795 | 11/1994 | Matsumoto | 524/501 |

FOREIGN PATENT DOCUMENTS

| | | |
|---|---|---|
| 0066382 | 12/1982 | European Pat. Off. . |
| 0418685 | 3/1991 | European Pat. Off. . |
| 0506036 | 9/1992 | European Pat. Off. . |
| 57-59929 | 4/1982 | Japan . |
| 58-1742 | 1/1983 | Japan . |
| 58-48584 | 10/1983 | Japan . |
| 4-300947 | 10/1992 | Japan . |

OTHER PUBLICATIONS

European Search Report for Application No. 94109089.6, mailed Sep. 6, 1994.

*Primary Examiner*—Vasu S. Jagannathan
*Attorney, Agent, or Firm*—Varndell Legal Group

[57] ABSTRACT

A process for preparing a synthetic resin powder having an improved blocking resistance suitable as a modifier for vinyl chloride resins, which comprises coagulating an aqueous latex of a graft copolymer suitable as a modifier for vinyl chloride resins, mixing the resulting slurry with a latex of a specific polymer of methyl methacrylate, an aromatic vinyl compound, a crosslinking monomer and optionally other copolymerizable monomers or a slurry formed from the specific polymer latex by coagulation, and recovering a powder from the resulting mixture containing the coagulated graft copolymer and the coagulated specific polymer.

6 Claims, No Drawings

PROCESS FOR PREPARING SYNTHETIC RESIN POWDER HAVING IMPROVED BLOCKING RESISTANCE

BACKGROUND OF THE INVENTION

The present invention relates to a process for preparing a synthetic resin powder having an improved blocking resistance, and more particularly to a process for improving blocking resistance of graft copolymers containing a rubber as a trunk polymer which are intended to incorporate into vinyl chloride resins in order to improve the properties of the vinyl chloride resins.

Improvement in powder properties of synthetic resins, particularly bulk density and blocking resistance of the powders, has hitherto been made in various manners. For instance, in Japanese Patent Publication Kokai No. 57-59992 it is proposed to coagulate a latex of a graft copolymer in a gaseous phase. This method improves the blocking resistance of the graft copolymer powder to a great degree.

Various graft copolymers wherein monomers are graft-polymerized onto an elastomer trunk, have been proposed and used as modifiers for vinyl chloride resins, particularly as impact modifiers, e.g. ABS resin, MBS resin and MABS resin. These graft copolymers used as modifiers for vinyl chloride resins are not satisfactory in blocking resistance.

In recent years, improvement in powder properties of synthetic resins such as blocking resistance has been increasingly demanded with application of automatic gaging to powders and change of transportation lines to large scale. Accordingly, further improvement of powder properties has been investigated.

I For instance, Japanese Patent Publication Kokoku No. 58-48584 proposes to improve the powder properties of a conventional graft copolymer containing a large quantity of a rubber, such as impact modifier for vinyl chloride resins, by mixing it with a graft copolymer having a low content of a rubber in the form of a slurry. However, the effect of improving the powder properties of this method is small since the graft copolymer added for the improvement of powder properties contains a rubber though the content is low. This Japanese publication also discloses in Comparative Example 3 to incorporate a polymer containing no rubber component, namely a copolymer of 55% by weight of methyl methacrylate and 45% by weight of styrene, into a conventional graft copolymer known as a modifier. In that case, powder properties of the conventional graft copolymer are improved, but the effect of the improvement is small like in the case of using a graft copolymer having a low rubber content as an improving agent. Moreover, it is disclosed that a large number of fish eyes generate in molded articles prepared from a vinyl chloride resin to which the thus treated modifier is incorporated, or the impact resistance of the molded articles is remarkably decreased.

Japanese Patent Publication Kokai No. 58-1742 discloses, improving the powder properties of a graft copolymer having a high content of a rubber known as a modifier by mixing the slurry of the graft copolymer with an emulsion of a hard non-elastomeric polymer. Japanese Patent Publication Kokai No. 4-300947 discloses improving the powder properties of a graft copolymer having a high content of a rubber known as a modifier by mixing a slurry of the graft copolymer with a slurry of a hard polymer containing methyl methacrylate as an essential component and containing 5 to 30% by weight of an acrylic acid ester prepared by a multi-stage polymerization. However, these methods have the disadvantage that when a large amount of an acrylic acid ester is used, the effect of improving the blocking resistance of the graft copolymer is small and when the amount is small, a large number of fish eyes generate in molded articles of vinyl chloride resins, thus these two important properties are not satisfied simultaneously.

There has been strongly demanded a modifier for vinyl chloride resins which has an improved blocking resistance and which can be incorporated into the vinyl chloride resins to give a vinyl chloride resin composition having excellent impact resistance and transparency without generating fish eyes in molded articles of the vinyl chloride resins.

It is an object of the present invention to provide a graft copolymer having an improved blocking resistance which can be incorporated into vinyl chloride resins is a modifier to give a vinyl chloride resin composition having excellent impact resistance and transparency without generating fish eyes in the molded articles prepared therefrom.

A further object of the present invention is to provide a process for improving the powder properties particularly the blocking resistance, of graft copolymers containing a rubber as a trunk polymer, which have been known as modifiers, particularly impact modifiers, for vinyl chloride resins or the like, without causing problems in generation of a large number of fish eyes, decrease of the effect of improving the impact resistance that the modifiers originally possess, and decrease of the transparency of molded articles of the vinyl chloride resins on the like.

These and other objects of the present invention will become apparent from the description hereinafter.

SUMMARY OF THE INVENTION

In accordance with the present invention, there is provided a process for preparing a powder of a synthetic resin having an improved blocking resistance which comprises the steps of coagulating an aqueous latex of a graft copolymer containing at least 40% by weight of a rubber as a trunk polymer to give a first aqueous slurry, said graft copolymer being a copolymer intended to incorporate as a modifier into a vinyl chloride resin therefor, mixing said first aqueous slurry with 0. 1 to 10 parts by weight of a polymer of 30 to 60% by weight of methyl methacrylate, 65 to 35% by weight of an aromatic vinyl monomer, 0. 1 to 25% by weight of a crosslinking monomer and 0 to 30% by weight of other copolymerizable monomers per 100 parts by weight of said graft copolymer in the form of an aqueous latex or a slurry as a second aqueous slurry, coagulating said polymer before mixing with said first aqueous slurry to give said second aqueous slurry or after mixing with said first aqueous slurry, and recovering a powder from the resulting mixture.

The process of the present invention provides a synthetic resin powder useful as a modifier for vinyl chloride resins, wherein the blocking resistance is remarkably improved without exerting a bad influence upon properties of molded articles prepared from vinyl chloride resins incorporated with modifier, such as generation of fish eye impact resistance and transparency.

DETAILED DESCRIPTION

Any of graft copolymers containing at least 40% by weight of a rubber as a trunk polymer which are known as a modifier intended to incorporate into vinyl chloride resins, can be used in the process of the present invention, e.g. ABS resin (acrylonitrile-butadiene-styrene resin), MBS resin (methyl methacrylate-butadiene-styrene resin) and MABS resin (methyl methacrylate-acrylonitrile-butadiene-styrene resin).

An aqueous latex of the graft copolymer is used as the starting material in the present invention. The graft copolymer latex can be prepared in a known manner. Firstly, a rubber as a trunk polymer is produced by a usual emulsion polymerization, and a monomer or monomers for grafting are then graft-polymerized in the resulting latex of the rubber.

Examples of a monomer used for producing the rubber are, for instance, a diene monomer such as butadiene or isoprene, and an alkyl acrylate such as butyl acrylate or octyl acrylate. These monomers may be copolymerized with a minor amount, especially less than 35 by weight, more especially 0 to 5% by weight, of other copolymerizable monomers and/or a crosslinking agent based on the total weight of the monomers.

Examples of the other copolymerizable monomers are, for instance, an alkyl methacrylate such as methyl methacrylate, a vinyl cyano compound such as acrylonitrile, an aromatic vinyl compound such as styrene, and the like.

Examples of the crosslinking agent are, for instance, a divinyl compound such as divinyl benzene, a diacrylate or dimethacrylate compound such as ethylene glycol diacrylate or polyethylene glycol dimethacrylate, and other polyfunctional compounds known as the crosslinking agent or monomer.

Examples of the monomers to be graft-polymerized onto the elastomeric trunk polymer are, for instance, an alkyl methacrylate such as methyl methacrylate, an alkyl acrylate, such as butyl acrylate, a vinyl cyano compound such as acrylonitrile, and an aromatic vinyl compound such as styrene.

From the viewpoints that the graft copolymer can be coagulated from its latex without forming a mass in the coagulation step and that the impact resistance of molded articles of a vinyl chloride resin is raised to a sufficient level, it is preferable that the proportions of the elastomeric trunk polymer and the graft component in the product obtained by the graft polymerization are from 40 to 85% by weight, especially 60 to 80% by weight, for the trunk polymer, and from 60 to 15% by weight, especially 40 to 20% by weight, for the graft component.

The average particle size of the graft copolymer in its latex is usually from 700 to 2,500, Å (70 to 250 nm). The graft copolymer is coagulated by adding a coagulant such as an acid and/or a salt to the latex of graft copolymer, thereby converting the latex into an aqueous slurry of polymer particles usually having an average particle size of 20 to 200 μm. The solid concentration of this slurry is usually from about 5 to about 40% by weight.

The acid used in the coagulation includes, for instance, sulfuric acid, hydrochloric acid, acetic acid, and other inorganic or organic acids conventionally used for coagulation of polymer latices. The salts used in the coagulation includes, for instance, sodium chloride, magnesium chloride, calcium chloride and other salts conventionally used.

The coagulation slurry of the graft copolymer is mixed with a polymer of (a) 30 to 60% by weight, preferably 35 to 55% by weight, of methyl methacrylate, (b) 65 to 35% by weight, preferably 50 to 40% by weight, of an aromatic vinyl compound, (c) 0.1 to 25% by weight, preferably 0.1 to 10% by weight, of a crosslinking monomer and (d) 0 to 30% by weight, preferably 0 to 10% by weight, of other copolymerizable monomers (this polymer being hereinafter referred to as "crosslinked polymer"). The crosslinked polymer can be added to the graft copolymer slurry in the form of an aqueous latex or an aqueous slurry formed by coagulation of the latex.

The solid concentration of the latex or the coagulation slurry of the crosslinked polymer is usually from about 0.5 to about 30% by weight, especially about 0.5 to about 10% by weight.

The slurry of the graft copolymer and the latex or slurry of the crosslinked polymer are thoroughly mixed, for instance, by means of an agitator or a line mixer. The mixing manner and means are not particularly limited.

The latex of the crosslinked polymer is obtained by a usual emulsion polymerization of the monomers (a) to (d).

The aromatic vinyl compound used in the preparation of the crosslinked polymer includes, for instance is styrene and α-methylstyrene, but not limited thereto.

Examples of the crosslinking monomer used in the preparation of the crosslinked polymer are, for instance, divinyl benzene, 1,3-butylene glycol dimethacrylate, polyethylene glycol dimethacrylate, and other known crosslinking monomers or agents such as divinyl compounds, diallyl compounds, dimethacrylate compounds and diacrylate compounds.

Examples of the other copolymerizable monomers optionally used in the preparation of the crosslinked polymer are, for instance, a vinyl cyano compound such as acrylonitrile, acrylic acid, methacrylic acid, an alkyl acrylate, an alkyl methacrylate other than methyl methacrylate, and a graftlinking agent or monomer which is well known in the art such as allyl methacrylate or diallyl maleate. The other copolymerizable monomers are not limited to these exemplified compounds.

If the content of methyl methacrylate in the crosslinked polymer does not fall within the range of 30 to 60% by weight, or if the content of the aromatic vinyl monomer does not fall within the range of 35 to 65% by weight, the index of refraction of the crosslinked polymer greatly deviates from the index of refraction of a vinyl chloride resin and, therefore, the transparency of molded articles of the vinyl chloride resin is decreased particularly when the particle size of the crosslinked polymer is large.

If the content of the crosslinking the monomer in the crosslinked polymer is less than 0.1% by weight, the blocking resistance of the graft copolymer powder is not sufficiently improved. If the content of the crosslinking monomer is more than 25% by weight, a large number of fish eyes generate in molded articles of vinyl chloride resins.

The average particle size of the crosslinked polymer in the latex is usually from 400 to 3,000, Å (40 to 300 μm). From the viewpoints of blocking resistance of the product and transparency of molded articles of vinyl chloride resins, it is preferable that the crosslinked polymer latex has an average particle size of 1,000 to 2,500, Å (100 to 250 nm), especially 1,200 to 2,000, Å (120 to 200 nm).

The latex of the crosslinked polymer is coagulated before or after adding to the slurry of graft copolymer. The coagulation is conducted in a usual manner by adding an acid and/or a salt as mentioned above to the latex of crosslinked polymer or its mixture with the graft copolymer slurry. In case that the crosslinked polymer has been added to the graft copolymer slurry in the form of a latex, it is not always required to add a coagulant in order to coagulate the crosslinked polymer, since the graft copolymer slurry used may contain a necessary mount of the coagulant for the coagulation of the crosslinked polymer.

The average particle size of the crosslinked polymer coagulated from its latex is preferably from 2 to 50 μm, more preferably 5 to 30 μm, from the viewpoint of general powder characteristics.

The larger the particle size of the crosslinked polymer in its latex, the larger the effect of improving the blocking resistance. However, when the particle size of the crosslinked polymer latex is large, the crosslinked polymer particles dispersed in molded articles of vinyl chloride resins may decrease the transparency of the molded articles. Accordingly, in order to prevent or minimize the decrease of the transparency, it is preferable to make the refraction index of the crosslinked polymer equal to that of a vinyl chloride resin or to make the refraction index of the crosslinked polymer approximate to that of a vinyl chloride resin as close as possible. That is to say, it is preferable that the difference in the index of refraction between the crosslinked polymer chloride resin is at and a vinyl most 0.1, especially at most 0.05.

The crosslinked polymer is used in an amount of 0.1 to 10 parts by weight, preferably 0.5 to 4 parts by weight, per 100 parts by weight of the graft copolymer. When the amount of the crosslinked polymer is outside the above rage, a satisfactorily improved blocking resistance is not, obtained, or decrease in transparency or impact resistance of molded articles of vinyl chloride resins or generation of a large number of fish eyes occurs.

In case that the crosslinked polymer has been added to the graft copolymer slurry in the form of an aqueous latex, the mixture of the graft copolymer slurry and the crosslinked polymer latex is subjected to the coagulation of the crosslinked polymer.

A synthetic resin powder is then recovered from the resulting slurry containing the graft copolymer and the crosslinked polymer in a usual manner, for instance, by heat-treating the slurry, washing with water, dehydrating and drying the powder.

The heat treatment is usually carried out at a temperature of 80° to 100° C. for 5 to 20 minutes.

The thus obtained powder has an improved blocking resistance and is suitably used as a modifier for vinyl chloride resins without causing problems as encountered by prior art.

The present invention is more specifically described and explained by means of the following Examples in which all % and parts are by weight unless otherwise noted.

EXAMPLE 1

A pressure polymerization vessel equipped with a stirrer was charged with 200 parts of water, 1.5 parts of sodium oleate, 0.002 part of ferrous sulfate ($FeSO_4.7H_2O$), 0.005 part of disodium ethylenediaminetetraacetate, 0.2 part of formaldehyde sodium sulfoxylate, 0.2 part of tripotassium phosphate, 75 parts of butadiene, 25 parts of styrene and 0.1 part of diisopropylbenzene hydroperoxide. The polymerization was carried out at 50° C. for 15 hours to give a conversion rubber latex (R-1). The polymerization was 99%

To 210 parts of the rubber latex R-1 (solid matter: 70 parts) were added 200 parts of water, 0.002 part of ferrous sulfate, 0.004 part of disodium ethylenediaminetetraacetate and 0.1 part of formaldehyde sodium sulfoxylate. To the latex was then continuously added a mixture of 15 parts of methyl methacrylate, 15 parts of styrene and 0.1 part of cumene hydroperoxide at 0° C. Over 4 hours, and the post-polymerization was further conducted for 1 hour to give an aqueous latex (G-1) of a graft copolymer having an average particle size of 900 Å (90 nm)

A pressure polymerization vessel equipped with a stirrer was charged with 200 parts of water, 0.5 part of sodium oleate, 0.002 part of ferrous sulfate ($FeSO_4.7H_2O$), 0.005 part of disodium ethylenediaminetetraacetate and 0.2 part of formaldehyde sodium sulfoxylate. The temperature was elevated to 0° C. and a mixture of 35 parts of methyl methacrylate, 45 parts of styrene, 20 parts of 1,3-butylene glycol dimethacrylate and 0.3 part of cumene hydroperoxide was continuously added to the vessel at 70° C. over 7hours. During this period of time, there 0.5 part portions of sodium oleate were added to the vessel 2 hours, 4 hours and 6 hours after starting the addition of the monomer mixture. After the completion of the addition of the monomer mixture, the post-polymerization was conducted at 70° C. for 2 hours to give an aqueous latex of a crosslinked polymer (L-1). The polymerization conversion was 99%.

To 300 parts (solid matter: 100 parts) of the graft copolymer latex G-1 was added 40 parts of a 5% aqueous solution of sulfuric acid to coagulate the graft copolymer. To the resulting slurry of the coagulated graft copolymer particles having an average particle size of 100 μm was added 9 parts of the crosslinked polymer latex L-1 (solid matter: 3 parts) with stirring the slurry. The resulting mixture was then heat-treated at 90° C. for 10 minutes, dehydrated and dried to give a synthetic resin powder having an average particle size of The blocking resistance of the obtained synthetic resin powder and the properties (transparency, impact resistance and generation of fish eye) of a molded article prepared from a composition containing 91 parts of a polyvinyl chloride and 9 parts of the obtained synthetic resin powder were measured according to the following methods.

The results are shown in Table 1.
(Blocking resistance)

A cylindrical vessel having a diameter of 40 mm was charged with 30 g of the synthetic resin powder, and a load of 1 kg/cm$^2$ was applied to the powder at 40° C. for 3 hours o form a block. The block was vibrated at 60 Hz for 10 seconds by a powder tester (Powder Tester PFE made by Hosokawa Micron Kabushiki Kaisha) to break the block, and the weight proportion of a powder which passed through a 18 mesh sieve based on the whole powder used was obtained The larger the value, the higher the blocking resistance.
(Properties of PVC composition)

A mixture of 9 parts of the obtained synthetic resin powder, 1.2 parts of a tin stabilizer (TVS 8831 made by Nitto Kasei Kabushiki Kaisha), 0.5 part of a lubricant (Loxiol G-11 made by Henkel Hakusui Kabushiki Kaisha) and 91 parts of a polyvinyl chloride (S1007 made by Kanegafuchi Kagaku Kogyo Kabushiki Kaisha) was kneaded by heat rolls at 160° C. for 8 minutes to give a sheet having a thickness of 1 min. The obtained sheet was then heat-pressed at 190° C. and 100 kg/cm$^2$.G for 15 minutes to give a sheet having a thickness of 5 mm.

Using the thus prepared sheet, the light transmission was measured according to JIS K 6714 to estimate the transparency, and the impact resistance was measured according to JIS K 7110.

Also, the above mixture was extruded through a T die to give a sheet, and the number of fish eyes within a area of 10 cm×100 cm was counted to estimate the problem of fish eye generation.

EXAMPLE 2

The procedure of Example 1 was repeated except that a crosslinked polymer latex L-2 was prepared from a monomer mixture of 55 parts of methyl methacrylate, 40 parts of styrene, 5 parts of 1,3-butylene glycol dimethacrylate and 0.3 part of cumene hydroperoxide, and was used instead of the latex L-1.

The results are shown in Table 1.

EXAMPLE 3

A pressure polymerization vessel equipped with a stirrer was charged with 200 parts of water, 0.5 part of sodium oleate, 0.002 part of ferrous sulfate ($FeSO_4.7H_2O$), 0.005 part of disodium ethylenediaminetetraacetate and 0.2 part of formaldehyde sodium sulfoxylate. The temperature was elevated to 70° C., and a mixture of 45 parts of methyl methacrylate, 40 parts of styrene and 0.2 part of cumene hydroperoxide was continuously added to the vessel at 70° C. over 7 hours. During this period of time, three 0.5 part portions of sodium oleate were added to the vessel 2 hours, hours and 6 hours after starting the addition of the monomer mixture. After 30 minutes from the completion of the addition of the monomer mixture, another monomer mixture of 10 parts of methyl methacrylate, 5 parts of 1,3-butylene glycol dimethacrylate and 0.1 part of cumene hydroperoxide was continuously added to the reaction system at 70° C. over 1 hour. The post-polymerization was then conducted for 2 hours to give a latex of crosslinked polymer (L-3). The polymerization conversion was 99%.

The procedure of Example 1 was repeated except that the crosslinked polymer latex L-3 was used instead of the latex L-1.

The results are shown in Table 1.

EXAMPLE 4

The procedure of Example 1 was repeated except that the amount of sodium oleate used in the initial charge for the preparation of the latex L-1 was changed from 0.5 part to 0.1 part, thus preparing a latex of crosslinked polymer (L-4).

The results are shown in Table 1.

EXAMPLE 5

The procedure of Example 1 was repeated except that a crosslinked polymer latex L-5 was prepared from a mixture of 45 parts of methyl methacrylate, 35 parts of styrene, 10 parts of divinyl benzene, 10 parts of 1,3 butylene glycol dimethacrylate and 0.3 part of cumene hydroperoxide, and was used instead of the latex L-1.

The results are shown in Table 1.

EXAMPLE 6

The procedure of Example 3 was repeated except that the amount of sodium oleate used in the initial charge for the preparation of the latex L-3 was changed from 0 5 part to 0.1 part, thus preparing a latex of crosslinked polymer (L-6).

The results are shown in Table 1.

Comparative Example 1

The procedure of Example 1 was repeated except that the crosslinked polymer latex L-1 was not used.

The results are shown in Table 1.

Comparative Examples 2 to 6

The procedure of Example 1 was repeated except that a monomer or a monomer mixture shown in Table 1 was used in the preparation of a polymer latex to be added to the graft copolymer.

Comparative Example 7

The procedure of Example 1 was repeated except that the mount of sodium oleate in the initial charge was change, to 0.1 part, and a crosslinked polymer latex was prepared from a monomer mixture of 25 parts of methyl methacrylate, 25 parts of styrene, 50 parts of 1,3-butylene glycol dimethacrylate and 0.3 part of cumene hydroperoxide.

The results are shown in Table 1.

TABLE 1

| | Polymer to be added to graft copolymer | | | Blocking | Properties of molded article | | |
|---|---|---|---|---|---|---|---|
| | Composition | Latex particle size (Å) | Amount of addition (part) | resistance of powder (%) | Transparency (%) | Impact resistance (kg · cm/cm$^2$) | Number of fish eyes |
| Ex. 1 | MMA(35)ST(45)DM(20) | 500 | 3 | 70 | 83.0 | 60 | 45 |
| Ex. 2 | MMA(55)ST(40)DM(5) | 500 | 3 | 50 | 83.0 | 60 | 40 |
| Ex. 3 | MMA(45)ST(40)←MMA(10)DM(5) | 500 | 3 | 75 | 83.0 | 60 | 35 |
| Ex. 4 | MMA(35)ST(45)DM(20) | 1500 | 3 | 90 | 82.5 | 60 | 45 |
| Ex. 5 | MMA(45)ST(35)DM(10)DVB(10) | 1500 | 3 | 80 | 83.0 | 60 | 45 |
| Ex. 6 | MMA(45)ST(40)←MMA(10)DM(5) | 1500 | 3 | 95 | 83.0 | 60 | 35 |
| Com. Ex. 1 | — | — | — (0) | 2 | 83.0 | 60 | 40 |
| Com. Ex. 2 | MMA(55)ST(45) | 500 | 3 | 25 | 83.0 | 60 | 100 |
| Com. Ex. 3 | MMA(100) | 500 | 3 | 50 | 83.0 | 44 | 300 |
| Com. Ex. 4 | ST(100) | 500 | 3 | 35 | 78.0 | 56 | 240 |
| Com. Ex. 5 | MMA(90)EA(10) | 500 | 3 | 25 | 82.0 | 60 | 40 |
| Com. Ex. 6 | MMA(40)BA(5)←MMA(45)BA(10) | 500 | 3 | 20 | 82.0 | 55 | 40 |
| Com. Ex. 7 | MMA(25)ST(25)DM(50) | 1500 | 3 | 100 | 75.0 | 45 | 350 |

(Notes)
MMA: methyl methacrylate
ST: styrene
DM: 1,3-butylene glycol dimethacrylate
DVB: divinyl benzene
BA: butyl acrylate
EA: ethyl acrylate In addition to the ingredients used in the Examples, other ingredients can be used in the Examples as set forth in the specification to obtain substantially the same result.

What we claim is:

1. A process for preparing a powder of a synthetic resin having an improved blocking resistance which comprises the steps of coagulating an aqueous latex of a graft copolymer containing at least 40% by weight of a diene or an acrylate rubber as a trunk polymer and made from said rubber and ethylenically unsaturated monomers to give a first aqueous slurry, said graft copolymer being a modifier for vinyl chloride resin, mixing said first aqueous slurry with 0.1 to 10 parts by weight of a polymer of 30 to 60% by weight of methyl methacrylate, 65 to 35% by weight of an aromatic vinyl monomer, 0.1 to 25% by weight of a crosslinking monomer and 0 to 30% by weight of other copolymerizable monomers per 100 parts by weight of said graft copolymer in the form of an aqueous latex or a slurry as a second aqueous slurry, coagulating said polymer before mixing with said first aqueous slurry to give said second aqueous slurry or after mixing with said first aqueous slurry, and recovering a powder from the resulting mixture; said other copolymerizable monomers being selected from the group consisting of vinyl cyano compound, acrylic acid, methacrylic acid, alkyl acrylate, an alkyl methacrylate other than methyl methacrylate and a graftlinking monomer.

2. The process of claim 1, wherein said polymer in the latex has an average particle size of 1,000 to 2,500 Å, and the difference in index of refraction between said polymer and a vinyl chloride resin is at most 0.1.

3. The process of claim 1, wherein said recovering is carried out by heat-treating, dehydrating and drying said mixture.

4. The process of claim 1, wherein said first slurry containing the graft copolymer has a solid concentration of 5 to 40% by weight.

5. The process of claim 1, wherein said aromatic vinyl monomer is styrene, α-methylstyrene or a mixture thereof.

6. The process of claim 1, wherein said crosslinking monomer is a member selected from the group consisting of a divinyl compound, a diacrylate compound and a dimethacrylate compound.

* * * * *